(12) United States Patent
Handke et al.

(10) Patent No.: US 8,403,116 B2
(45) Date of Patent: Mar. 26, 2013

(54) PROTECTIVE PIPE FOR A PISTON/CYLINDER UNIT

(75) Inventors: Günther Handke, Euerbach (DE); Alexander Miller, Litzendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 470 days.

(21) Appl. No.: 12/675,489

(22) PCT Filed: Aug. 13, 2008

(86) PCT No.: PCT/EP2008/060609
§ 371 (c)(1),
(2), (4) Date: Feb. 26, 2010

(87) PCT Pub. No.: WO2009/027228
PCT Pub. Date: Mar. 5, 2009

(65) Prior Publication Data
US 2010/0213655 A1 Aug. 26, 2010

(30) Foreign Application Priority Data

Aug. 28, 2007 (DE) .......................... 10 2007 040 455
Aug. 5, 2008 (DE) .......................... 10 2008 040 984

(51) Int. Cl.
*F16F 9/00* (2006.01)
(52) U.S. Cl. .................................................. 188/322.19
(58) Field of Classification Search ............. 188/322.19, 188/322.12, 277, 287; 267/64.15
See application file for complete search history.

(56) References Cited

U.S. PATENT DOCUMENTS

| | | | | |
|---|---|---|---|---|
| 3,957,259 A | * | 5/1976 | Peddinghaus | 267/64.15 |
| 4,167,991 A | | 9/1979 | Karklins et al. | |
| 4,372,429 A | | 2/1983 | Marx | |
| 5,074,389 A | * | 12/1991 | Slocum | 188/277 |
| 5,620,067 A | * | 4/1997 | Bauer et al. | 188/322.19 |
| 6,006,873 A | * | 12/1999 | Kirst | 188/287 |

FOREIGN PATENT DOCUMENTS

| | | |
|---|---|---|
| DE | 937273 | 12/1955 |
| DE | 1951753 | 12/1966 |
| DE | 1951754 | 12/1966 |
| DE | 2618019 | 12/1976 |
| DE | 2850051 | 6/1979 |
| DE | 8228262 | 1/1983 |
| DE | 3735058 | 4/1989 |
| DE | 19653393 | 6/1998 |
| DE | 102004003661 A1 | 8/2005 |
| DE | 102004003661 B4 | 8/2005 |
| DE | 102008040984 | 3/2009 |
| EP | 1741864 | 1/2007 |
| JP | 11223235 | 8/1999 |
| JP | 2000074126 | 3/2000 |
| JP | 2001108005 | 4/2001 |
| JP | 2006234068 | 9/2006 |

* cited by examiner

*Primary Examiner* — Melanie Torres Williams
(74) *Attorney, Agent, or Firm* — Cozen O'Connor

(57) ABSTRACT

A protective pipe for a piston-cylinder unit comprises a pipe body having at one end a bottleneck-shaped base which is axially and radially supported at least indirectly at a piston rod of the piston-cylinder unit. A surface region of the bottleneck-shaped base has an accumulation of material which increases radially inward starting from its outer edge.

12 Claims, 5 Drawing Sheets

Fig. 8
Fig. 9
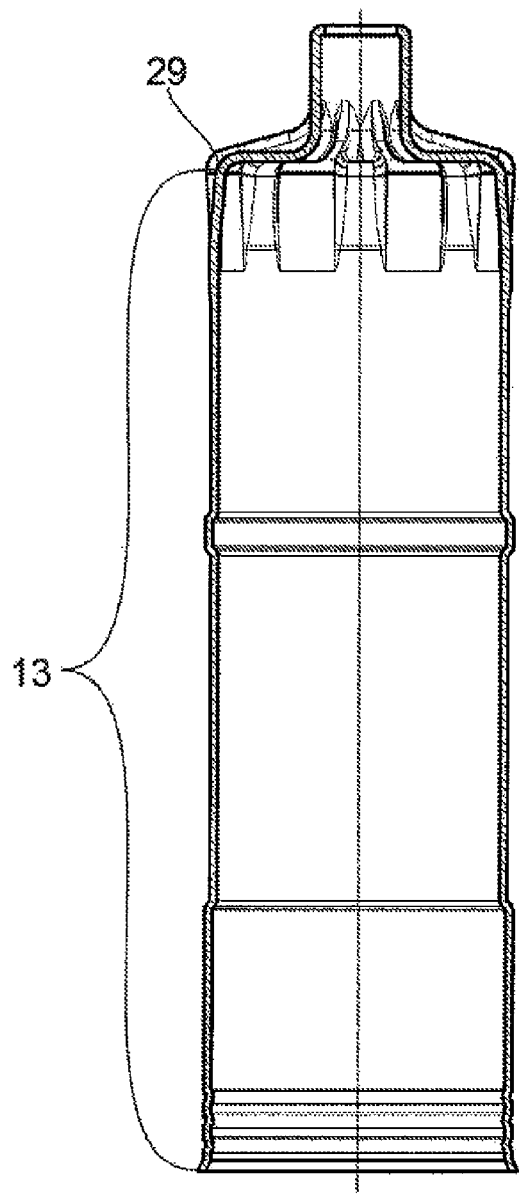
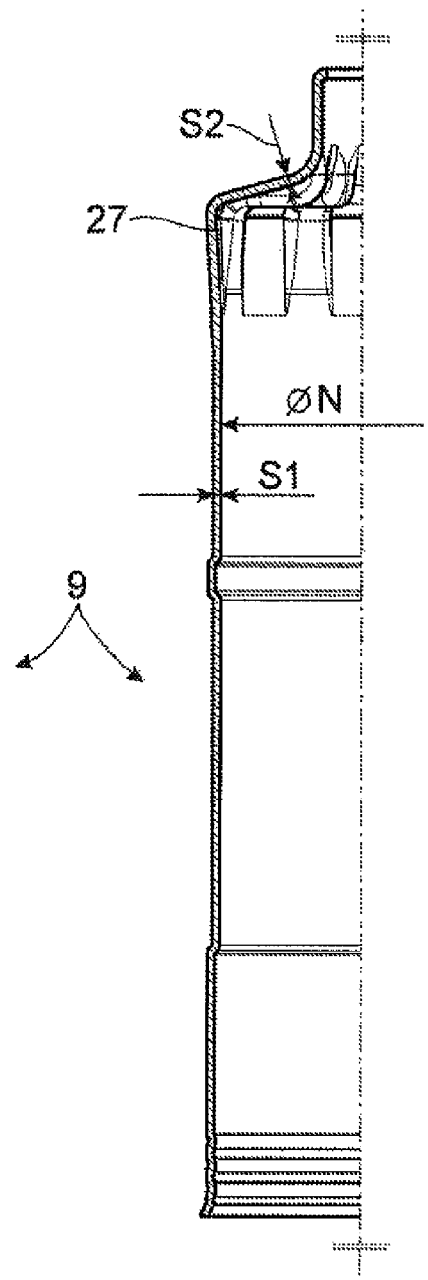

PROTECTIVE PIPE FOR A PISTON/CYLINDER UNIT

PRIORITY CLAIM

This is a U.S. national stage of application No. PCT/EP2008/060609, filed on Aug. 13, 2008, which claims priority to the German Application No.: 10 2007 040 455.9, filed: Aug. 28, 2007; and German Application No. 10 2008 040 984.7 filed Aug. 5, 2008 the contents which are incorporated herein by reference.

BACKGROUND OF THE INVENTION

1. Field of the Invention

The invention is directed to a protective pipe for a piston-cylinder unit.

2. Prior Art

A piston rod of a piston-cylinder unit is a component whose surface must be shielded from dirt so that a seal closing the cylinder is not destroyed by fine particles in the dirt.

Protective pipes made of plastic have become popular for reasons having to do with weight. The protective pipe has a base that is often supported on a shoulder of the piston rod. The base is frequently produced as an annular metal disk which is connected by positive engagement to a plastic pipe. The metal base provides for good dimensional stability of the plastic pipe but adds considerably to the cost of the protective pipe. In this connection, reference is had to DE 28 50 051 A1; DE 19 51 753 U, or DE 19 51 754 U.

DE 37 35 058 A1 discloses a one-piece protective pipe made of plastic in the construction shown in FIG. 2. Starting from a nominal diameter, the protective pipe has a conical transitional area extending radially inward and which opens into a horizontally extending clamping surface that contacts a shoulder of the piston rod. While this protective pipe made entirely of plastic has a cost advantage, it cannot achieve the qualities of a protective pipe with a metal base with respect to dimensional stability.

DE 82 28 262 U1 discloses in FIG. 1 a one-piece plastic protective pipe that extends parallel to the piston rod on a longitudinal portion in the area of a screw-on part and is radially centered in this way.

SUMMARY OF THE INVENTION

It is an object of the present invention to realize a protective pipe for a piston-cylinder unit made entirely of plastic and optimized with respect to dimensional stability.

According to one embodiment of the invention, this object is met by a conical surface region of a bottleneck-shaped base having an accumulation of material which increases radially inward from its outer edge.

The base is reinforced against bending loads to prevent a critical shape deviation when the protective pipe is radially loaded. This operating characteristic facilitates the use of a one-piece protective pipe which, as was already mentioned, has a considerable cost advantage over a solution comprising multiple parts.

In one embodiment of the invention, the wall thickness of the base increases toward the radial inner side. The inner side extends at right angles to the longitudinal axis of the piston rod.

Further, the wall thickness of the pipe body increases towards the base. This provides an appreciable stabilization of the protective pipe against bending forces precisely at the transitional area between the base and the pipe body.

Depending on the installation space provided for the piston-cylinder unit, the inner diameter of the pipe body decreases towards the base and/or the outer diameter of the pipe body increases towards of the base.

In one embodiment of the invention, the surface region of the base has a rib structure. In spite of a comparatively economical use of material and a small mass, good dimensional stability is achieved.

The outer diameter of the pipe body can also have ribs extend towards the base. The ribs in the pipe body need not be formed along the entire length of the pipe body. A region directly adjoining the base is of particular importance.

To facilitate removal of the protective pipe from the mold, the ribs at the outer diameter of the pipe body merge with the rib structure of the base.

In one embodiment of the invention, the pipe body has a greater and constant nominal material thickness in the supporting region merging with the base. This variant can be provided with a rib structure at the base and at the pipe body.

BRIEF DESCRIPTION OF DRAWINGS

The invention will be described in more detail with reference to the following description of the figures.

FIGS. 8 and 9 are alternative variant with constant material thickness in the region of the base.

DETAILED DESCRIPTION OF THE PREFERRED EMBODIMENTS

Figure 1:
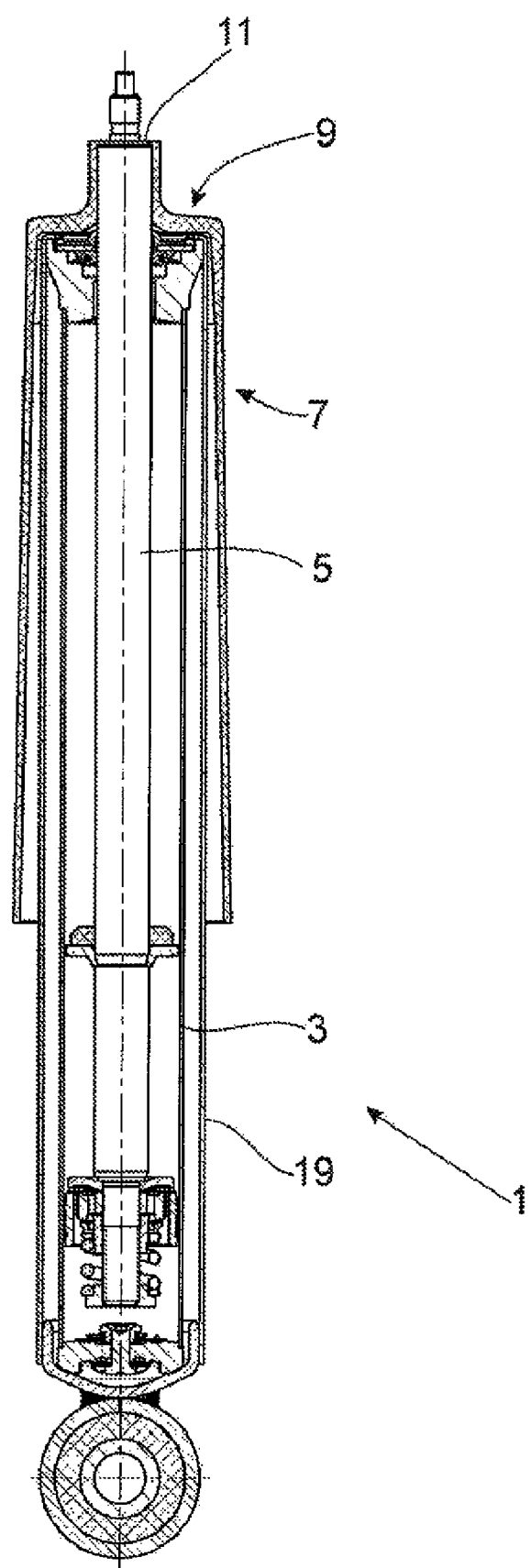
FIG. 1 is sectional view of the piston-cylinder unit.

FIG. 1 shows a piston-cylinder unit 1 of a vibration damper. A piston rod 5 is guided inside a cylinder 3 so as to be movable axially. A portion of the piston rod 5 projects out of the cylinder 3 and is enclosed by a protective pipe 7, which is guided axially and radially on a shoulder 11 of the piston rod 5 by its bottleneck-shaped base 9.

Figure 2:
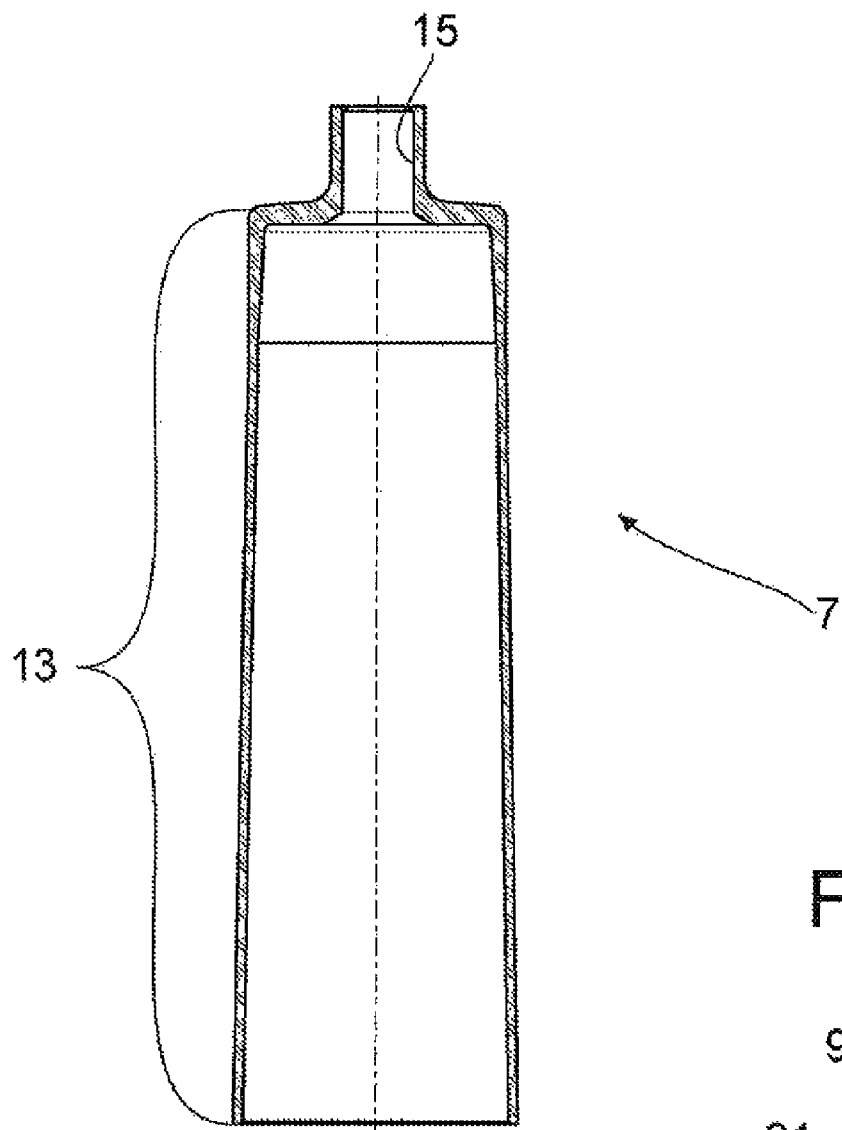
FIG. 2 is protective pipe from FIG. 1.
Figure 3:
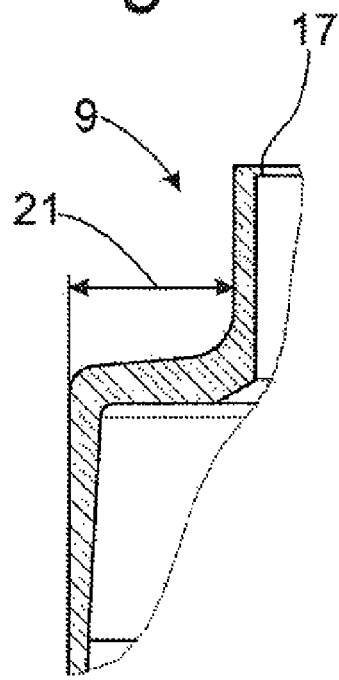
FIG. 3 is detailed view referring to FIG. 2.
Figure 4:
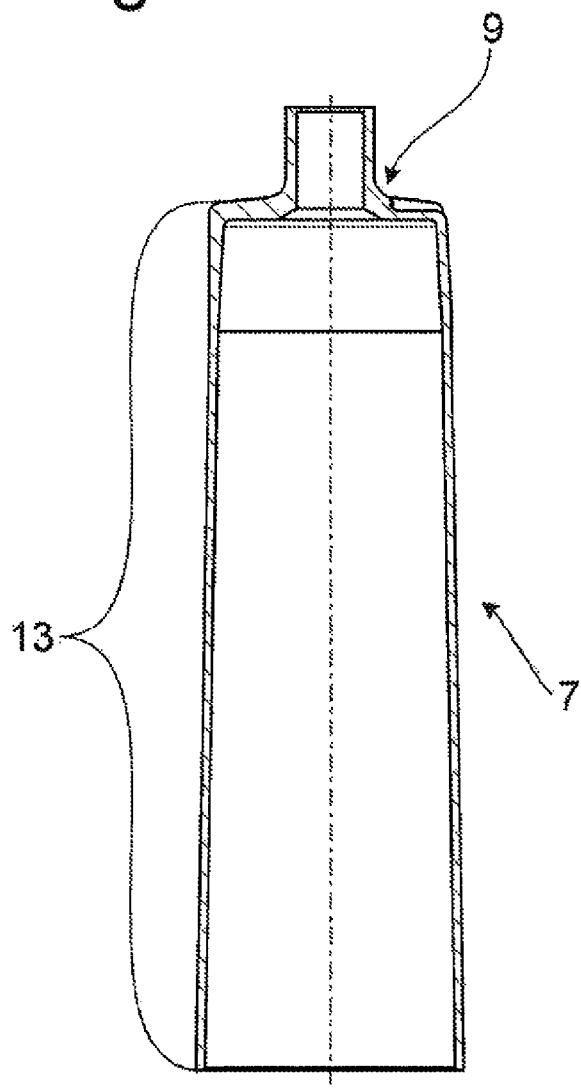
FIGS. 4-7 are alternative variant with rib structure.

The protective pipe 7 according to FIG. 1 is shown as an individual part in FIG. 2. For added clarity, FIG. 3 shows only the base 9 on the end side of protective pipe 7. The protective pipe 7 has a pipe body 13 which is made of plastic. The pipe body 13 has a constant wall thickness over most of its length (FIG. 2). If required, the pipe body 13 can be slightly funnel-shaped, the base 9 being constructed at the end having the smaller diameter. (FIG. 3)

The bottleneck-shaped base 9 has a guide portion 15 that directly contacts the outer surface of the piston rod 5 and provides for radial positioning. (FIGS. 2, 10) At its end opposite from the base 9, the guide portion 15 has an edge 17 which faces radially inward and which contacts the shoulder 11 of the piston rod 5 and accordingly takes over the axial positioning of the protective pipe relative to the piston rod 5. (FIG. 3)

To prevent contact between the protective pipe 7 and an outer cylinder 19 when the protective pipe 7 is radially loaded at its open end, the base 9 has an increasing accumulation of material in radial inward direction starting from its outer edge. In the variant according to FIGS. 2 and 3, the material accumulation is achieved by means of an increase in wall thickness. In addition, the wall thickness of the pipe body also increases in direction of the base 9. As is evident from FIG. 3 in particular, the inner diameter of the pipe body 13 decreases in direction of the base 9. This results in a conically extending cross section inside the wall of the pipe body 13. Also, the base 9 has a conical surface region 21 extending from the outer edge to the guide portion 15, and the inner side of the base 9 extends at right angles to the longitudinal axis of the piston rod 5.

Figure 7:
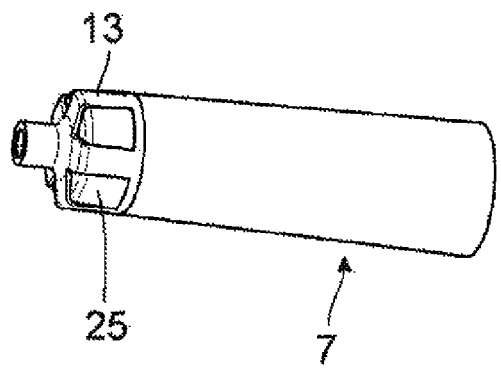
Figure 5:
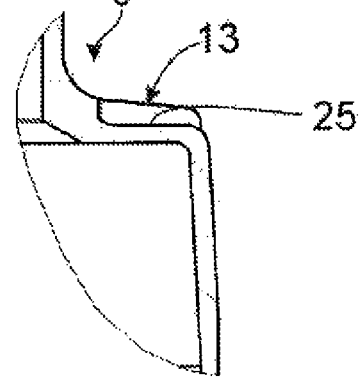
Figure 6:
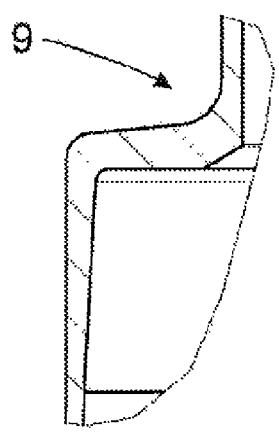

Viewed in conjunction, FIGS. 4 to 7 show an embodiment of the protective pipe 7 according to FIG. 2. In contrast the latter, the pipe body 13 has ribs 23 at the outer diameter which run in direction of the base 9. In addition, conically extending pockets 25 are formed in an end portion of the protective pipe 9 (FIG. 5). The ribs 23 at the outer diameter of the pipe body 13 merge with a rib structure of the base (FIGS. 5 and 7).

A variant of a protective pipe 7 which is optimized particularly with respect to weight is shown in FIGS. 8 and 9. The greater portion of the pipe body 13 has a relatively thin wall thickness $S_1$. On the other hand, an end portion 27 of the pipe body 13 has a wall thickness $S_2$ in direction of the base 9 that is consistently greater than the rest of the protective pipe. Starting from a nominal diameter N of the protective pipe, the outer diameter increases in a profiled length 29 in the end area until the base 9. The end area 27 extends conically therebetween in radial inward direction so that continuous beads 31 are formed in the end area 27 of the pipe body 13 and in the base area 9 up to the guide portion 15, which beads 31 likewise form a material accumulation and allow an appreciable increase in the section modulus of the protective pipe with respect to bending.

Figure 10:
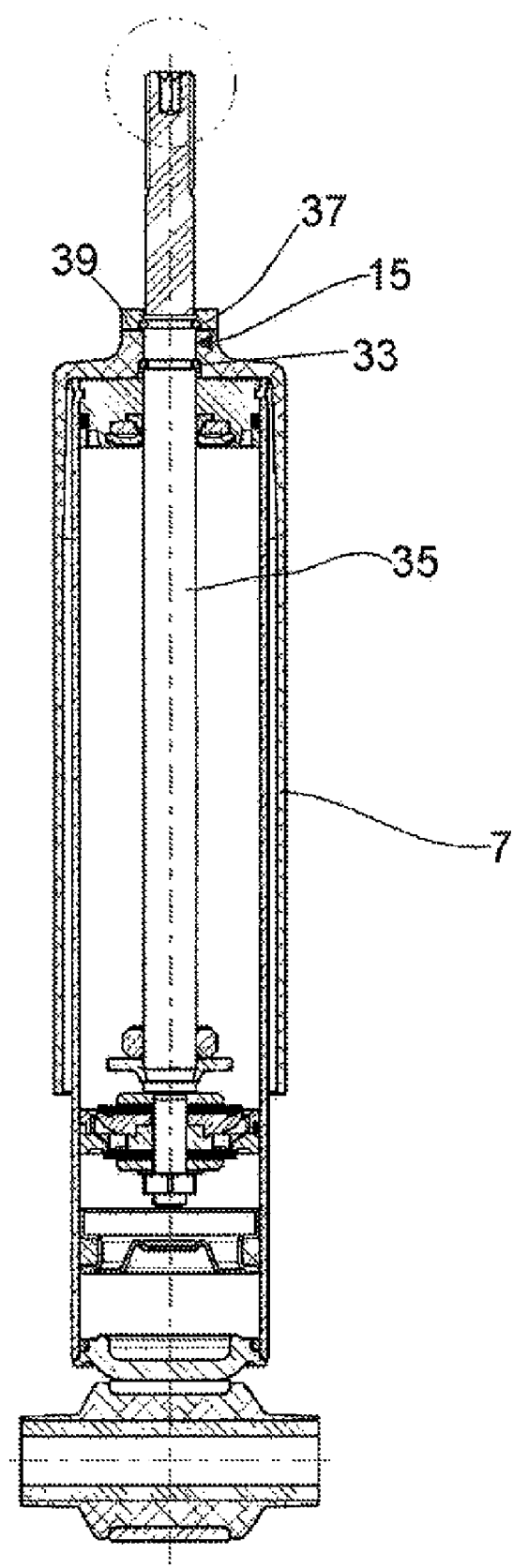
FIG. 10 is a sectional view of a piston-cylinder unit.

The embodiments according to FIGS. 1 to 9 show forms of a protective pipe 7 in which the axial fixation is carried out along the edge facing radially inward at the end of the guide portion 15. An even simpler solution according to FIG. 10 is characterized in that the protective pipe 7 is held axially on two sides by a first shoulder 33 of a piston rod 35 formed by a first retaining ring and a second shoulder 37 of the piston rod formed by a second retaining ring 39. The first and second retaining rings engage at the ends of the guide portion 15, respectively. A supporting ring for a connection member, not shown, is supported above the second retaining ring. The manufacturing tolerances are selected in such a way that there is at least a minimum distance between the underside of the supporting ring 39 and the upper end face of the protective pipe 7 so that a load on the connection member is not transmitted to the protective pipe.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A protective pipe for a piston-cylinder unit comprising:
   a pipe body; and
   a bottleneck-shaped base end arranged at a first end of the pipe body, the bottleneck-shaped base end configured to be axially and radially supported at least indirectly at a piston rod of the piston-cylinder unit, a surface region of the bottleneck-shaped base end comprising an accumulation of material that increases radially inward from its outer edge,
   wherein the pipe body has a first material thickness and a second material thickness, the second material thickness greater than the first material thickness, the second material thickness arranged in the end region of the pipe body merging into the base end.

2. The protective pipe according to claim 1, wherein a wall thickness of the base end increases radially inward.

3. The protective pipe according to claim 1, wherein a wall thickness of the pipe body increases towards the base end.

4. The protective pipe according to claim 1, wherein an inner diameter of the pipe body decreases towards the base end.

5. The protective pipe according to claim 1, wherein an outer diameter of the pipe body increases in a direction of the base end.

6. The protective pipe according to claim 1, wherein the surface region of the base end comprises a rib structure.

7. The protective pipe according to claim 1, wherein an outer diameter of the pipe body comprises ribs extending in a direction of the base end.

8. The protective pipe according to claim 6, further comprising ribs arranged on an outer diameter of the pipe body, the ribs at the outer diameter of the pipe body configured to merge with the rib structure of the base end.

9. The protective pipe according to claim 3, wherein an inner diameter of the pipe body decreases in a direction of the base end.

10. The protective pipe according to claim 3, wherein an outer diameter of the pipe body increases in a direction of the base end.

11. The protective pipe according to claim 5, wherein the surface region of the base end has a rib structure.

12. The protective pipe according to claim 5, wherein the outer diameter of the pipe body has ribs extending in the direction of the base end.

* * * * *